United States Patent [19]
Drummond et al.

[11] Patent Number: 6,017,991
[45] Date of Patent: Jan. 25, 2000

[54] POLYOLEFIN FILM COMPOSITION AND RESINS USEABLE THEREFORE AND RELATED MAKING METHOD

[75] Inventors: Donald Kendall Drummond, Quakertown; Joseph Anthony Radosta, Easton; Donald Richard Deutsch, Walnutport, all of Pa.

[73] Assignee: Minerals Technologies Inc., Bethlehem, Pa.

[21] Appl. No.: 09/131,494

[22] Filed: Aug. 10, 1998

Related U.S. Application Data

[63] Continuation-in-part of application No. 08/934,761, Sep. 22, 1997, Pat. No. 5,866,646.

[51] Int. Cl.$^7$ ..................................................... C08K 3/34
[52] U.S. Cl. ........................... 524/451; 524/448; 524/445; 524/442
[58] Field of Search ..................................... 524/451, 448, 524/445, 442

[56] References Cited

U.S. PATENT DOCUMENTS

| | | | |
|---|---|---|---|
| 4,111,892 | 9/1978 | Kamada et al. | 524/412 |
| 4,445,970 | 5/1984 | Post et al. | 162/135 |
| 5,089,200 | 2/1992 | Chapman, Jr. et al. | 264/127 |
| 5,866,646 | 2/1999 | Radosta | 524/451 |

*Primary Examiner*—David W. Wu
*Assistant Examiner*—Ling Sui Choi
*Attorney, Agent, or Firm*—Marvin J. Powell; Terry B. Morris

[57] ABSTRACT

This invention concerns a mixture of a first component selected from talcs and one or more second component(s) selected from diatomaceous earth, natural and synthetic silica, clay, ceramic spheres, volcanic ash and glass cullet wherein the ratio of the component to the second component(s) provides an enhanced abrasiveness property, an enhanced die pressure character, and a reduced melt fracture character. The invention further relates to an antiblock agent made from such mixture that significantly reduces or eliminates the need to provide polymer processing additives. This invention also relates to a masterbatch composition having an admixture such that enhanced die pressure character and/or reduced melt fracture character are obtained.

8 Claims, No Drawings

POLYOLEFIN FILM COMPOSITION AND RESINS USEABLE THEREFORE AND RELATED MAKING METHOD

This is a continuation-in-part application of U.S. Ser. No. 08/934,761, filed Sep. 22, 1997, now U.S. Pat. No. 5,866,646.

FIELD OF INVENTION

This invention relates to polyolefin resin compositions, precursor materials used therein and films made therefrom.

More particularly, the invention relates to the use of a combination of talc and feldspar, nepheline and/or nepheline syenite.

BACKGROUND

The invention pertains to polyolefin resin compositions that are designed to produce clear films that have satisfactory antiblocking capability and where the antiblocking agent exhibits low abrasivity. These films would be used in a broad range of packaging and covering film applications.

Polyolefin films are used extensively for packaging around the world and, increasingly, are replacing traditional materials such as paper. High clarity polyolefin films allow easy viewing and identification of the package contents. When plastic film is produced, however, there is a tendency for two or more contacting layers of the film to stick together, or "block", making separation of the film, opening the bag, or finding the end of the roll difficult.

Addition of inorganic mineral fillers to polyolefin film to reduce blocking is required commercially. It is well recognized that films produced from resin containing antiblock fillers have a rougher surface, which reduces the intimate contact between layers of film and reduces blocking, hence, the term "antiblocking agent" is applied to such fillers.

Not all inorganic fillers are effective antiblocks and some effective antiblocks have other problems (such as high cost, high abrasivity, adverse affect on optics, health hazard) which limit their commercial utility. The objective is to add as little antiblock as possible to reduce blocking force to the required level, while minimizing the adverse effects on optical properties of the film and other concerns such as wear on processing equipment.

Diatomaceous earth has been widely used as a moderately effective antiblocking agent but has the following adverse attributes: fair film haze, poor film clarity, very high abrasiveness, and is moderately expensive. Talc is also widely used in certain polyolefin formulations as a moderately effective antiblocking agent. Its advantages over diatomaceous earth are lower cost, excellent film clarity, and very low abrasiveness. However, its film haze is usually only fair and would not be suitable for high clarity packaging applications. While nepheline syenite or feldspar have been considered as antiblocking agents for high clarity film applications (because their optical index of refraction is closer to that of polyethylene), they are relatively ineffective in reducing blocking forces, and have very high abrasiveness.

Abrasivity of inorganic antiblocks is of concern for several reasons. Highly abrasive antiblocks will contribute to rapid equipment wear in compounding and processing equipment. When wear reaches the point where it changes the equipment dimensions in critical areas, both dispersion of additives in the resin and output rates can be adversely affected. In such cases, product quality may suffer and production costs may increase, particularly if the equipment must be taken out of service and new parts purchased to replace worn pieces of equipment. In addition, abrasion of equipment will introduce metal contamination into the plastic product, which may have a detrimental effect on product stability or color or both. Antiblocks with low abrasiveness are preferred for these reasons.

There have been many attempts by others to solve the problem of balancing polyolefin film antiblocking and haze properties but none have addressed the additional concerns of film clarity and the antiblock abrasivity and cost (which are all necessary considerations for a viable commercial product). The existing situation is that a cost effective antiblocking formulation for high clarity polyolefin films with low abrasivity of the antiblock has not yet been found.

RELATED ART

In Matsumoto et al, "Method for the Production of Antifog Polyolefin Film" Japanese Kokai No. 60 (1985)-49,047, there is disclosed a method of using a polyolefin resin composition containing polyolefin resin, two types of finely powdered inorganic filler, an unsaturated fatty acid amide and a mixed fatty acid polyester.

In Hayashida et al, "Polyolefin Resin Composition", U.S. Pat. No. 5,346,944 there is disclosed a polyolefin resin composition having an antiblocking agent and, optionally, an antistatic agent, an antifogging agent and antioxidants.

SUMMARY OF THE INVENTION

The present invention concerns a mixture of a first component selected from talcs and a second component selected from feldspars, nephelines and nepheline syenites, wherein the ratio of the first component to the second component provides an abrasiveness property significantly less than that expected from the law of mixtures. The invention further relates to an antiblock agent comprising a mixture of a first component selected from talcs and a second component selected from feldspars, nephelines and nepheline syenites, wherein the ratio of the first component to the second component provides an antiblocking action significantly greater than either component alone. This agent does not result in a significant loss of optical properties when used in a polyolefin film.

This invention also relates to a mixture of a first component selected from talcs and a second component selected from feldspars, nephelines and nepheline syenites, wherein the ratio of the first component to the second component provides an abrasiveness property significantly less than that expected from the law of mixtures and wherein the ratio of the first component to the second component provides an antiblocking action significantly greater than either component alone.

This invention also relates to a polyolefin resin composition wherein the ratio of the first component to the second component further provides an antiblocking action significantly greater than either component alone, and the abrasiveness property of the first and second component in mixture is about eighty percent or less than that expected from the law of mixtures.

Also this invention relates to a polyolefin film comprising the polyolefin resin composition, and such film can be made from the above components having an abrasiveness property significantly less than that expected from the law of mixtures, and the film can have an antiblocking action significantly greater than when made from either component alone.

An advantage of the present invention is that the mixtures and polyolefin resin compositions can be used to produce films that have satisfactory antiblocking and optical properties (haziness and clarity). The precursor mixtures also can have low abrasivity. The combination produces a synergistic effect wherein the degree of antiblocking action is unexpectedly higher than either alone, while still retaining optical properties and having low abrasivity.

DESCRIPTION OF EMBODIMENTS OF THE INVENTION

One embodiment of the present invention is a mixture of a first component selected from talcs and a second component selected from feldspars, nephelines and nepheline syenites, wherein the ratio of the first component to the second component provides an abrasiveness property significantly less than that expected from the law of mixtures.

Preferably the abrasiveness property is about eighty percent or less of than that expected from the law of mixtures, more preferably is about fifty percent or less of than that expected from the law of mixtures.

This mixture has use as a precursor material useable in polyolefin resin compositions and in films and other types of products, such as sheets, molds and castables, manufactured from such polyolefin resin compositions. Polyolefins considered suitable for the present invention may be any polyolefin, which can be clear, crystalline, and capable of forming a self-supported film. Non-limiting examples include crystalline homopolymers of a-olefin with carbon numbers ranging from 2 to 12 or a blend of two or more crystalline copolymers or ethylene-vinylacetate copolymers with other resins. Also, the polyolefin resin can be a high-density polyethylene, low density polyethylene, linear low-density polyethylene, polypropylene, ethylene-propylene copolymers, poly-1-butene, ethylene-vinyl acetate copolymers, etc., and low and medium-density polyethylenes. Additional examples are represented by random or block copolymers of polyethylene, polypropylene poly-r-methylpentene-1, and ethylene-propylene; and ethylene-propylene-hexane copolymers. Among them, copolymers of ethylene and propylene and those containing 1 or 2 selected from butene-1, hexane-1, 4-methylpentene-1, and octene-1 (the so-called LLDPE) are particularly suitable. The method of producing polyolefin resin used in the present invention is not limited. For example, it can be manufactured by ionic polymerization or radical polymerization. Examples of polyolefin resins obtained by ionic polymerization include homopolymers such as polyethylene, polypropylene, polybutene-1, and poly-4-methylpentene and ethylene copolymers obtained by copolymerizing ethylene and a-olefin, a-olefins having from 3 to 18 carbon atoms such as propylene, butene-1,4-methylpentene-1, hexens-1, octene-1, decene-1, and octadecene-1 are used as a-olefins. These a-olefins can be used individually or as two or more types. Other examples include propylene copolymers such as copolymers of propylene and butene-1. Examples of polyolefin resins obtained by radical polymerization include ethylene alone or ethylene copolymers obtained by copolymerizing ethylene and radical polymerizable monomers. Examples of radical polymerizable monomers include unsaturated carboxylic acids such as acrylic acid, methacrylic acid and maleic acid esters and acid anhydrides thereof, and vinyl esters such as vinyl acetate. Concrete examples of esters of unsaturated carboxylic acids include ethyl acrylate, methyl methacrylate and glycidyl methacrylate. These radical polymerizable monomers can be used individually or as two or more types.

The talc in the present invention is selected from those talcs useable for manufactured polyolefin materials. A typical talc is monoclinic in crystal structure, has a specific gravity of about 2.6 to 2.8 and an empirical formula of $Mg_3 Si_4 O_{10} (OH)_2$.

Preferably, the average particle size of the talc used is from about 0.1 microns to about 10 microns.

The second component is selected from feldspars, nephelines and nepheline syenites, or mixtures thereof. Such materials are known to those in the art and are conveniently defined in "Minerals and Rocks", *The New Encyclopedic Britannica*, Vol. 24, pp. 151–157, 175–179, Encyclopedia Britannica, Inc. (Chicago, 1986), incorporated herein by reference in its entirety.

Preferably the average particle size of the second component used is from about 0.1 micron to about 10 microns.

The mixture is made by any convenient mixing operation which does not adversely reduce or agglomerate the component. Such mixing can be, but is not required to be, integrated into the milling operation, if any, of the components.

The abrasiveness property can be determined by using the Einlehner AT 1000 abrasion tester and the recommended methodology of the manufacturer, as such equipment and methods are known in the art. Incorporated herein by reference in its entirety is the manual "Einlehner Abrasion Tester AT 1000".

In another embodiment, the present invention is an antiblock agent comprising a mixture of a first component selected from talcs and a second component selected from feldspars, nephelines and nepheline syenites, wherein the ratio of the first component to the second component provides an antiblocking action significantly greater than either component alone.

In a preferred embodiment, the ratio of the two components is from about 5/95 to about 95/5; preferably about 1/3 to about 3/1, that is, about 25 percent to about 75 percent of talc with the balance being the second component. More preferably, the ratio is from about 45/55 to about 75/25.

Preferably, the antiblocking action produces a blocking degree of about eighty-five percent or less than either component alone; more preferably a blocking degree of about seventy-five percent or less than either component alone; and even more preferably a blocking degree of about fifty percent or less than either component alone.

The antiblock agent can be used to produce a polyolefin film and when so used, preferably the mixture of the first component and the second component does not result in a significant loss of optical properties such as clarity and haze.

In another embodiment, the invention is a mixture of a first component selected from talcs and a second component selected from feldspars, nephelines and nepheline syenites, wherein the ratio of the first component to the second component provides an abrasiveness property significantly less than that expected from the law of mixtures and wherein the ratio of the first component to the second component provides an antiblocking action significantly greater than either component alone.

Preferably, the ratio of the first and second component ranges from 5/95 to 95/5, more preferably about 1/3 to 3/1, and the abrasiveness property of the first and second component in mixture is about fifty percent or less than that expected from the law of mixtures and the antiblocking agent produces a blocking degree of about fifty percent or less.

The mixture of the first and second component can be produced as a precursor mixture added into a polyolefin resin composition or formulated in situ in either a polyolefin resin composition or as a portion of the polyolefin film production. The order of addition of the separate components is not critical. When formulated in situ, the components can be added separately in sequence or simultaneously or into separate master batches to be later blended together.

In yet another embodiment, the invention is a polyolefin resin composition having a mixture of a first component selected from talcs and a second component selected from feldspars, nephelines and nepheline syenites, wherein the ratio of the first component to the second component provides an abrasiveness property significantly less than that expected from the law of mixtures.

Another embodiment is a polyolefin film comprising the polyolefin resin composition having a ratio of the first component to the second component which provides an abrasiveness property significantly less than that expected from the law of mixtures and further provides an antiblocking action significantly greater than either component alone.

Preferably, the polyolefin resin composition has a mixture of the first and second component wherein the ratio of the first component to second component is from about 5/95 to 95/5, more preferably 1/3 to 3/1, and the abrasiveness property of the first and second component in mixture is about eighty percent or less than that expected from the law of mixtures and the first and second component in combination produces a blocking degree of about fifty percent or less.

In another embodiment, the invention is a polyolefin film comprising a first component selected from talcs and a second component selected from feldspars, nephelines and nepheline syenites, wherein the ratio of the first component to the second component provides an abrasiveness property significantly less than that expected from the law of mixtures.

Preferably, the polyolefin film comprising a first component selected from talcs and a second component selected from feldspars, nephelines and nepheline syenites, wherein the ratio of the first component to the second component provides an abrasiveness property significantly less than that expected from the law of mixtures and wherein the ratio of the first component to the second component provides an antiblocking action significantly greater than either component alone.

While the foregoing describes the present invention in a narrow focus of a mixture of talc and nepheline syenite and/or feldspar to benefit clarity or antiblocking characteristics in a polyolefin film, it has also been discovered that mixtures of talc and feldspar, nepheline syenite, diatomaceous earth, natural and synthetic silica, clay, ceramic spheres, volcanic ash and/or glass cullet provide unexpected results in the abrasiveness property character of film material.

Accordingly, another embodiment of the present invention is a mixture of a first component selected from talcs and a second component selected from the specified mineral group consisting of feldspar, nepheline syenite, diatomaceous earth, natural and synthetic silica, clay, ceramic spheres, volcanic ash and/or glass cullet, preferably feldspar and nepheline syenites, wherein the ratio of the first component to the second component provides an abrasiveness property significantly less than that expected from the law of mixtures.

Preferably the abrasiveness property is about eighty percent or less of than that expected from the law of mixtures, more preferably is about fifty percent or less of than that expected from the law of mixtures. Experimental results below illustrate the unexpected results obtained in Einlehner testing of inventive compositions against single materials.

Einlehner Abrasion Testing

Samples of materials were tested under two conditions of abrasion testing and evaluated in an Einlehner AT 1000 instrument. Run 1 condition was 25 minutes, which was equivalent to 43,500 revolutions, and Run 2 condition was 100 minutes, which is equivalent to 174,000 revolutions. The abrasion results are tabulated below:

| Sample | Run 1 (milligrams) | Run 2 (milligrams) |
| --- | --- | --- |
| Single components | | |
| Talc | 0.1 | 1.6 |
| Diatomaceous Earth | 28 | 326.7 |
| Feldspar | 86.4 | 450.4 |
| Ceramic Sphere | 6.5 | 22.7 |
| Calcined Clay | 7.8 | 26.2 |
| Natural Silica | 26.9 | 353.4 |
| Blends(50/50) | | |
| Talc/Diatomaceous Earth | 15.3 | 47.1 |
| Talc/Feldspar | 28.6 | 93.6 |
| Talc/Ceramic Sphere | 4 | 12.1 |
| Talc/Calcined Clay | 2.2 | 5.5 |
| Talc/Natural Silica | 18.3 | 52.9 |

While the foregoing describes the present invention in a narrow focus of a mixture of talc and feldspar, nepheline syenite, diatomaceous earth, natural and synthetic silica, clay, ceramic spheres, volcanic ash and/or glass cullet to benefit clarity or antiblocking characteristics in a polyolefin film, it has also been discovered that mixtures of talc and feldspar, nepheline syenite, diatomaceous earth, natural and synthetic silica, clay, ceramic spheres, volcanic ash and/or glass cullet provide unexpected results in the fracture character and/or Theological character of film material.

Accordingly, in yet another embodiment, the present invention is a mixture of a first component selected from talcs and a second component selected from the specified mineral group consisting of feldspar, nepheline syenite, diatomaceous earth, natural and synthetic silica, clay, ceramic spheres, volcanic ash and/or glass cullet, preferably feldspars and nepheline syenites, wherein the ratio of the first component and second component provides an unexpectedly significantly enhanced die pressure character for the mixture. This die pressure character for the mixture is manifested when the inventive mixture is a component of a polymer resin masterbatch subject to use in a polymer die or extruder or other similar apparatus to make a product, such as film, blown or otherwise. This die pressure character of the inventive composition is unexpectedly enhanced with the effective ratio than for use of talc alone. The die pressure character is the measurement of pressure drop of the masterbatch composition in passing through a processing apparatus. The higher the pressure drops, the better the die pressure character.

The measured pressure drop in the use of the inventive composition compared to an equivalent amount of talc alone is preferable about 100% greater, more preferably about 300% greater, even more preferably about 1000% greater or higher. Although the ratio of the first and second components to achieve a particular die pressure character will be dependant on the composition of the masterbatch composition, one of skill in the art will be able to determine the desired (e.g. optimal) ratio readily once in possession of this invention.

In yet another embodiment, the present invention is a mixture of a first component selected from talcs and a second component selected from the specified mineral group consisting of feldspar, nepheline syenite, diatomaceous earth, natural and synthetic silica, clay, ceramic spheres, volcanic ash and/or glass cullet, preferably feldspars and nepheline syenites, wherein the ratio of the first component and second component provides an unexpectedly significantly enhanced melt fracture character for the mixture. This melt fracture character for the mixture is manifested when the inventive mixture is a component of a polymer resin masterbatch subject to use in a polymer die or extruder or other similar apparatus to make film, blown or otherwise. This melt fracture character of the inventive composition is unexpectedly enhanced with the effective ratio than for use of talc alone. The melt fracture character is the measurement of the resistance to the occurrence of melt fracturing of the masterbatch composition as determined by a typical melt fracture test used in the polyolefin film industry, such as a step test or the time to condition the die surface. The lower the melt fracture value, the better the melt fracture character.

The measured melt fracture in the use of the inventive composition compared to an equivalent amount of talc alone is preferable about 50% of talc alone, more preferably about 10%, even more preferably at least about 1% or lower. Although the ratio of the first and second components to achieve a particular melt fracture character will be dependant on the composition of the masterbatch composition, one of skill in the art will be able to determine the desired (e.g. optimal) ratio readily once in possession of this invention.

In a further embodiment, the inventive mixture has a ratio of the first component selected from talcs and a second component selected from the specified mineral group consisting of feldspar, nepheline syenite, diatomaceous earth, natural and synthetic silica, clay, ceramic spheres, volcanic ash and/or glass cullet, preferably feldspar and nepheline syenites, which ratio is effective to reduce the amount of a polymer processing aid (PPA), preferably a fluorocarbon elastomer (e.g. fluoroelastomer), used in a masterbatch to which the inventive mixture is added. The effective ratio is that which affords the desired antiblocking character of the produced polymer product (e.g.. film) while retaining the desired melt fracture character of the polymer product due to the presence of the fluoroelastomeric processing additive.

Polymer process aids (PPA) are additives incorporated into plastics as a modifier in the extrusion of film or plastic sheet. PPAs can be in the form of fluorocarbon elastomer which are intended to be incorporated into polyethylene film and act as a coating on the die and internal surface. Fluorocarbon elastomer PPAs reduce or eliminate the phenomenon of melt extrudate in which the surface appears rough or wavy upon exit from the die. Melt fracture or sharkskin is a rheologic problem caused by the zero flow or slip/stick of the polymer melt at the die lip surface. Fluorocarbon elastomer PPA can be Teflon based or silicone based under the trademarks of Viton®, Dynamar®, Dyneon, and others. Other additives that modify or enhance the extrusion are slip agents, anti-oxidants, and UV stabilizers, in addition to flame retardants, antistats and antifog agents. Slip agents provide surface lubrication following the processing of plastics. They are additives compounded into the plastic, which gradually migrate to the surface where they reduce the coefficient of friction. Examples of slip agents are Erucamide, a fatty acid-based additive, and Oleamide, an ivory colored powder.

Antioxidant agents are additives that inhibit the degradation and oxidation of a material when exposed to ambient air and subsequently in the end product form. Various types of phosphites, phosphates, amines, esters and phenobics are used to retard polymer degradation by neutralizing adverse reactions between catalyst residuals and antiblock pigments, extending processing parameters of resin.

UV stabilizers absorb UV radiation in the region of 290–400 nanometers preventing photo degradation. The most common type is benzophenome.

The addition of antiblocking agents generally has a negative effect on additives by the adsorption of additives onto the mineral surface that reduces their availability in the plastic melt and resultant film.

Fluoroelastomer processing additives, while expensive, are very efficient and operate at low levels in clear polyethylene systems. However, when other ingredients are added, PPA efficiency decreases due to interactions with these additives, and results in higher process aid demand. The extent of these interactions varies with the composition of the additive and with the amount of additive PPA contact. The latter is increased by either increased mixing or by mixing at higher concentrations. As these interactions occur, the cost of using PPA as a solution to melt fracture increases.

Antiblocks of all types fall into the category of additions which interact with PPA and therefore, in general complicate the process. This increased PPA demand is theoretically the result of three phenomenons:

1. Competition at the die surface between the antiblocking agent or other additives.
2. Increased drag on the die coating due to increased compatibility with the melt.
3. Coating of the PPA by the additive and visa versa during mixing operations.

It has been unexpectedly found that by effectively selecting the ratio of the first component selected from talcs and the second component selected from the specified mineral group consisting of feldspar, nepheline syenite, diatomaceous earth, natural and synthetic silica, clay, ceramic spheres, volcanic ash and/or glass cullet, preferably feldspars or nepheline syenites, that the need to provide additional fluoroelastomer polymer processing additive is significantly reduced or eliminated as compared to the case of talc alone with a fluoroelastomer polymer processing additive.

In yet still another embodiment, the present invention is a process for the preparation of a masterbatch composition. This masterbatch composition is prepared by effectively admixing (1) an antiblock composition made of a first component selected from talcs and a second component selected from feldspar and nepheline syenites and (2) a polymer processing additive, such effective admixing being performed for a length of time and intensity to either enhance the die pressure character of the masterbatch or decrease the melt fracture character of the masterbatch, or both. Such character is judged against a masterbatch containing talc alone and polymer processing aid.

The present invention is described in the following illustrative examples which are not intended to limit the scope of the invention.

EXAMPLES

Examples 1

Laboratory abrasiveness measurements of antiblock agents were conducted using an Einlehner Abrasion Tester. Minerals and combinations thereof were tested for abrasiveness compared to diatomaceous earth as a control. Samples of Talc A (PolyTalc AG609), Talc B (Polybloc), nepheline syenite (Minex 7), and diatomaceous earth (Super Floss) were tested. Samples and blends are described as follows:

Test 1=50/50* Blend of Talc A and Nepheline syenite
Test 2=50/50 Blend of Talc B and Nepheline syenite
Test 3=75/25 Blend of Talc A and Nepheline syenite
Test 4=25/75 Blend of Talc A and Nepheline syenite
Test 5=100% Talc A
Test 6=100% Nepheline syenite
Test 7=100% diatomaceous earth

* "50/50" means 50 weight percent to 50 weight percent.

All samples were tested on the Einlehner Model AT-1000 Tester as 10% dry minerals solids slurries. The wear body was a bronze wire screen. Test duration was 100 minutes and/or 174,000 abrasion cycles. The test result represents the weight loss of the wire expressed in milligrams(mgs). Results are provided in Table 1.

TABLE 1

| Test # | Antiblock Mineral(s) | Einlehner Abrasion (mg) |
|---|---|---|
| 1 | 50/50 Blend of Talc A and Nepheline syenite | 24 |
| 2 | 50/50 Blend of Talc B and Nepheline syenite | 26 |
| 3 | 75/25 Blend of Talc A and Nepheline syenite | 14 |
| 4 | 25/75 Blend of Talc A and Nepheline syenite | 49 |
| 5 | 100% Talc A | 1.3 |
| 6 | 100% Nepheline syenite | 131 |
| 7 | 100% diatomaceous earth | 144 |

Example 2

In this experiment, talc and nepheline syenite minerals, alone and in combinations, along with diatomaceous earth as a control were compounded into LDPE (low density polyethylene) resin using a Leistritz twin screw extruder at a total loading of 50% to produce antiblock master batches. The ratio of talc to nepheline syenite was varied from 0/100 to 100/0. The master batches were then let down (mixed) with LDPE and an erucamide slip masterbatch and blown into one millimeter thick film using a single screw blown film line so as to yield a final film formulation of 2000 ppm (parts per million) total mineral antiblock and 750 ppm erucamide slip agent. The film products were then tested for blocking degree and optical properties (haze and clarity) using the following procedures.

Test Procedures (1) Blocking Degree

The parallel plate method of ASTM D3354-74 was used to measure degree of blocking. In preparing the samples, 8"×8" pieces were cut from the lay flat tubing. The double film layer was separated, passed slowly over a grounded bar to remove static charges, and then reunited so that the inside surfaces of the original bubble were in contact with each other. All films were conditioned under a top load of 1.0 psi for 24 hours using a recirculating forced air oven set at 40° C. The force required to separate these two layers was then determined and expressed as grams.

(2) Haze

This test was conducted according to ASTM D 1003. Haze is the percentage of transmitted light which in passing through the film specimen, is scattered. The lower the haze number, the better the light-transmitting film optical property.

(3) Clarity

A Zebedee CL-100 clarity meter was used for this test and operated in accordance with the manufacturers procedure.

Optical clarity is defined as the distinctness of detail that an object can be seen through a film. The higher the clarity number, the better the object resolution of the film.

Specific antiblocking minerals used for these samples were: Talc A (PolyTalc AG609), Talc B (Polybloc), nepheline syenite (Minex 7), and diatomaceous earth (Super Floss). Results of blocking degree, haze and clarity for the samples of Example 2 are in Table 2.

TABLE 2

Formulation: 2000 ppm Antiblock and 750 ppm Slip in LDPE Film

| Sample # | Antiblock Agent @ 2000 ppm | Blocking Degree | Haze | Clarity |
|---|---|---|---|---|
| 1 | 50/50 Blend of Talc A and Nepheline syenite | 33.9 | 5.5 | 51 |
| 2 | 50/50 Blend of Talc B and Nepheline syenite | 34.1 | 5.6 | 47 |
| 3 | 75/25 Blend of Talc A and Nepheline syenite | 35.5 | 5.5 | 55 |
| 4 | 25/75 Blend of Talc A and Nepheline syenite | 31.5 | 5.4 | 51 |
| 5 | 100% Talc A | 42.7 | 5.3 | 57 |
| 6 | 100% Nepheline syenite | 43.5 | 4.9 | 50 |
| 7 | 100% Diatomaceous earth | 35.6 | 5.6 | 33 |

Example 3

In this additional experiment, the antiblock masterbatches described in Example 2 were let down with LDPE resin and blown into one millimeter thick film using a single screw blown film line so as to yield a final film formulation of 5500 ppm total mineral antiblock. The film products were then tested for blocking degree and optical properties (haze and clarity) using the same test methods as described in Example 2. Results of blocking degree, haze and clarity for the samples of Example 3 are in Table 3.

TABLE 3

Formulation: 5500 ppm Antiblock and No Slip in LDPE Film

| Sample # | Antiblock Agent @ 5500 ppm | Blocking Degree | Haze | Clarity |
|---|---|---|---|---|
| 1 | 50/50 Blend of Talc A and Nepheline syenite | 32 | 7.3 | 38 |
| 2 | 100% Talc A | 56 | 8.4 | 47 |
| 3 | 100% Nepheline syenite | 58 | 6.5 | 28 |
| 4 | 100% Diatomaceous earth | 39 | 8.8 | 10 |
| 5 | 100% Talc C[1] | 39 | 8.2 | 29 |

[1]Talc C is ABT 2500 talc.

Experiment 4

A series of experiments was performed to determine the interactions of the inventive mixture compared to talc alone when used in a masterbatch to manufacture low density polyethylene film.

Inventive talc was prepared and evaluated for clarity performance in LDPE film as described in reference D. Deutsch et al., "Talc Antiblocks for Polyolefin Resins: Current Status and New Developments", ADDCON Asia '97 Conference Proceeding (1997), incorporated herein in it entirety.

The antiblock samples were compounded with linear low density polyethylene (LLDPE) and fluorocarbon elastomer polymer process aid (PPA) which gave low and high PPA interactions with the antiblock. In the low interaction scenario, the antiblock and PPA (VITON® Free Flow SAX 7431) were compounded separately (separate masterbatch) with LLDPE in a ZSK co-rotating low intensity twin screw extruder at loading levels of 30% and 10%, respectively. In high interaction scenario, the separate batched described above were compounded together (combined masterbatch) with LLDPE at 5000 ppm antiblock and 1000 ppm PPA to give intimate mixing of the antiblock and PPA. The compounding was completed on a W & P ZSK twin screw extruder with 28 MM screws and L/D ratio of 25:1. The melt temperature during extrusion was 200° C.

The effect of antiblock type on PPA performance was determined in a rate of conditioning type test by use of a ¾" Brabender single screw extruder fitted with a 1"×0.020" ribbon tape die. The extruder was run with a sheer rate of 400–500 seconds and with an output of 20 grams per minute. PPA performance was monitored by die pressure and by percent melt fracture of the extruded LLDPE tape over a one-hour time period.

Prior to extrusion on the tape die, the separate masterbatch samples were physically blended with LLDPE to give a final talc and PPA concentration of 5000 and 1000 ppm, respectively. The combined masterbatch samples were tape extruded as prepared at 5000 ppm antiblock and 1000 ppm PPA.

Following the tape extrusion studies at constant PPA dosage, experiments were conducted with varying levels of PPA using several types of antiblocks. The antiblocks included ABT® 2500 Talc (standard talc), inventive talc, diatomaceous earth and synthetic silica. These samples were prepared similarly to the separate masterbatch samples described above. Here the PPA dosage was varied from 0 to 1400 ppm in 200 ppm increments. The samples were extruded at a constant rate (20 g/min) for one hour at each PPA level with die pressure and tape melt fracture being monitored throughout.

For the mixing intensity studies, the extruder screw configuration was changed to give a low and high level of mixing. The samples were prepared similarly to the combined masterbatch samples described above except that the PPA dosage was varied from 0 to 1500 ppm in 250 ppm increments. The samples were then evaluated in a step-test fashion as described above.

Samples for the blown film studies were prepared by dry blending LLDPE (polymer), process aid (PPA), antiblock, slip agent, lubricant, and two antioxidants followed by extrusion through a W & P ZSK twin screw extruder with 28 mm screws and a L/D ratio of 25:1 and a melt temperature of 200° C. The PPA type and dosage was as listed for each experiment. The antiblock dosage was 5000 ppm for LLPDE (Celite® Superfloss 238) and talc was 2000 ppm for synthetic silica (Crósfield Gasil AB705). The slip agent (Erucamide) and lubricant (Zinc Stearate) dosages were 1200 and 500 ppm, respectively. The two antioxidants were Irganox® 1010 and Irgafhos® 168 from Ciba-Giegy and were dosed at 300 and 1,000 ppm, respectively.

The blown film line consisted of a 2½ inch Welex extruder with a L/D ratio of 30:1 and fourstage temperature profile was 150, 180, 200 and 204° C. with a melt temperature of 200–204° C. The blown film die diameter was 4 inches with a 0.020 inch die gap. Output was about 22 pounds per hour which gave a shear rate of about 270 seconds. Die pressure was continuously monitored and percent melt fracture was determined visually.

RESULT AND DISCUSSION

Antiblock for High Clarity Film Applications

The "See-Through Test" is described in the reference D. Deutsch et al., "Talc Antiblock for Polyolefin Resins". A single layer of film is mounted in an 8" diameter embroidery hoop. The distance at which a standard line of upper and lower case letters can be read without distortion is recorded. The higher the distance, the better the optical properties of the film. In contrast to haze determinations, the see-through values are more a bulk property of the film.

Table 4 demonstrates the exceptional optical properties that can be achieved with an autoclave produced LLDPE clarity grade resin as compared to films made with conventional resins. Because these films do not contain any antiblock, they all exhibit unacceptable blocking behavior. An example is presented in Table 5. Through the addition of 5000 ppm of the developmental clarity antiblock to autoclave LDPE it was achieved good antiblocking properties (less than 45 grams for 40° C. induced reblock), low haze at 6.5%, and excellent see-through optics (greater than three times improvement compared to diatomaceous earth).

The Effects of Separate and Combined Masterbatch on the Performance of Process Aids The results of the effect of the samples in the performance of PPA are tabulated in Tables 6 and 7. The PPA dosage was held constant at 1000 PPA performance as measured by pressure and melt fracture was monitored for one hour. Table 6 lists the separate masterbatch results. In this scenario talc and PPA are not intimately mixed, giving a low interaction situation. The pressure drop and melt fracture after one hour are listed in Table 6. The results of the combined masterbatch scenario are listed in Table 7. This represents the most intimate mixing possible of process aid and antiblock.

The Effect of Antiblock Type on the Performance of PPA

Commercially available standard talc and inventive talc antiblock samples were compared to the competitive diatomaceous earth and synthetic silica systems. In these evaluations, PPA dosage was increased stepwise, by 200 ppm, every hour, until 1400 ppm PPA was reached. The results of the PPA dosage step studies with PPA are summarized in Table 8. Table 8 lists the dosage of PPA required to start lowering the die pressure and the percent melt fracture at this critical dosage.

The Effect of Compounding Mixing Intensity and Antiblock Type on the Performance of Process Aids The amount of mixing between an antiblock and processing aid during compounding can have a differing effect on the performance of the process aid. More intense mixing during compounding can significantly increase the amount of PPA required to reduce die pressure and eliminate melt fracture.

To study this effect, LLDPE resin was compounded with PPA and three antiblock samples which included standard talc, and diatomaceous earth. The three samples were compounded under both low and high intensity mixing and then evaluated on the SMI tape die apparatus. Mixing intensity was varied by changing the screw configuration in the compounder. The samples were evaluated in a step test with PPA dosage from 0 to 1500 ppm at a constant antiblock dosage of 5000 ppm. Both melt fracture and die pressure were monitored throughout the test. Under low intensity mixing all three samples performed similarly with respect to melt fracture.

The Comparison of Laboratory Tape Die Results with Commercial Blown Film Results In this study the amount of PPA required to eliminate melt fracture on the laboratory tape die for several antiblocks including commercial standard talc, diatomaceous earth and synthetic silica is determined. Using the same resin and antiblocks, the amount of PPA required to eliminate melt fracture on the blown film line is determined. The results are summarized in Table 10. For the tape die experiments the minimum amount of PPA required to eliminate melt fracture after 60 minutes is determined. For the blown film experiments a 100 minute time period is used. Listed in Table 10 is the amount of PPA required to eliminate melt fracture and the corresponding drop in die pressure for each antiblock. Inspection of Table 10 shows the degree of agreement between the two techniques.

TABLE 4

FILM PERFOMANCE PROPERTIES FOR 1 MIL BAREFOOT POLYETHYLENE BLOWN FILM SAMPLES NO ANTIBLOCK

| Barefoot Resin | 40° C. Induced Reblock | Haze (%) | See-Through Test (Inches) |
|---|---|---|---|
| Conventional LLDPE | 170 | 6.3 | 28 |
| Conventional LDPE | 160 | 5.7 | 32 |
| Autoclave LDPE | 170 | 4.4 | 48 |

TABLE 5

FILM PERFORMANCE PROPERTIES FOR 1 MIL AUTOCLAVE LDPE BLOWN FILM SAMPLES CONTAINING 5,000 PPM ANTIBLOCK

| Antiblock @ 5000 PPM | 40° C. Induced Reblock (gms) | Haze (%) | See-Through Test (Inches) |
|---|---|---|---|
| Inventive Talc Composition | 42 | 6.5 | 16.0 |
| Standard Talc | 43 | 8.2 | 4.2 |
| DE | 36 | 9.5 | 4.9 |
| Extra Fine Diatomaceous Earth | 38 | 8.1 | 4.9 |

TABLE 6

PPA - ANTIBLOCK RATE OF CONDITIONING EVALUATION LOW INTERACTION SEPARATE MASTERBATCH SCENARIO

| Antiblock | Pressure Drop (psi) | % Melt Fracture |
|---|---|---|
| Inventive Talc Composition | 679 | 3 |
| Standard talc | 196 | 30 |

The concentration of antiblock was 5000 ppm.
The concentration of PPA was 1000 ppm.

TABLE 7

PPA - ANTIBLOCK RATE OF CONDITIONING EVALUATION HIGH INTERACTION COMBINED MASTERBATCH SCENARIO

| Antiblock | Pressure Drop (psi) | % Melt Fracture |
|---|---|---|
| Inventive Talc Composition | 250 | 60 |
| Standard talc | 3 | 95 |

The concentration of antiblock was 5000 ppm.
The concentration of PPA was 1000 ppm.

TABLE 8

PPA - ANTIBLOCK STEP TEST ANALYSIS: PRESSURE BREAK DATA PPA DOSAGE EVALUATION

| Antiblock | Pressure Break (psi) | PPA (ppm) | % Melt Fracture |
|---|---|---|---|
| Standard talc | 1952 | 1200 | 40 |
| DE | 2203 | 800 | 40 |
| Synthetic Silica | 1924 | 600 | 2 |
| Inventive Talc Composition | 2035 | 400 | 15 |

TABLE 9

EFFECT OF ANTIBLOCK LEVEL ON INDUCED BLOCKING 40° C. INDUCED REBLOCK (gms)

| Antiblock Level ppm | ABT ® 2500 Talc (standard talc) | Diatomaceous Earth (DE) |
|---|---|---|
| 0 | 170 | 170 |
| 500 | 140 | 142 |
| 1000 | 132 | 135 |
| 2000 | 88 | 90 |
| 5000 | 30 | 30 |

1 mil Butene LLDPE Co polymer Blown Film Samples.

TABLE 10

TAPE DIE VERSUS BLOWN FILM RESULTS PPA REQUIREMENTS TO ELIMINATE MELT FRACTURE

| | Tape Die Results | | Blown Film Results | |
|---|---|---|---|---|
| Antiblock Type | PPA Dosage[1] (ppm) | Die Pressure (psi) | PPA Dosage[2] (ppm) | Die Pressure (psi) |
| Standard Talc | 2200 | 600 | 2400 | 1510 |
| DE | 1600 | 830 | 1800 | 670 |
| Synthetic Silica | 1500 | 810 | 1600 | 950 |

[1] The amount if PPA required to eliminate melt fracture after 60 minutes.
[2] The amount of PPA required to eliminate melt fracture after 100 minutes.

What is claimed is:

1. A mixture comprising a ratio of a talc and one or more second component(s) selected from the mineral group consisting of diatomaceous earth, natural and synthetic silica, clay, ceramic spheres, volcanic ash and glass cullet, wherein the ratio of the first component and second component(s) provides an unexpectedly significantly enhanced die pressure character for the mixture.

2. The mixture of claim 1 wherein the die pressure drop is about 100% greater than with talc alone.

3. A mixture comprising a ratio of a talc and one or more component(s) selected from the mineral group consisting of diatomaceous earth, natural and synthetic silica, clay, ceramic spheres, volcanic ash and glass cullet, wherein the ratio of the first component and second component(s) provides an unexpectedly significantly reduced melt fracture character for the mixture.

4. The mixture of claim 3 wherein the melt fracture compared to an equivalent amount of talc alone is about 50%.

5. The mixture of claim 4 wherein the melt fracture compared to an equivalent amount of talc alone is about 1%.

6. A mixture comprising a ratio of a talc and one or more component(s) selected from the mineral group consisting of diatomaceous earth, natural and synthetic silica, clay, ceramic spheres, volcanic ash and glass cullet, which ratio is effective to reduce the amount of a polymer processing aid (PPA) used in a masterbatch to which the inventive mixture is added compared to talc alone.

7. A mixture comprising a ratio of a talc and one or more second components selected from the mineral group consisting of diatomaceous earth, natural and synthetic silica, clay, ceramic spheres, volcanic ash and glass cullet such that the need to provide additional polymer processing additive is significantly reduced or eliminated as compared to the case of talc alone with a polymer processing additive.

8. A masterbatch composition prepared by effectively admixing (1) an antiblock composition made of a talc and one or more second component(s) selected from the mineral group consisting of diatomaceous earth, natural and synthetic silica, clay, ceramic spheres, volcanic ash and glass cullet and (2) a polymer processing additive, such effective admixing being performed for a length of time and intensity to either enhance the die pressure character of the masterbatch or reduce the melt fracture character of the masterbatch, or both.

* * * * *